United States Patent [19]

Yamaguchi et al.

[11] Patent Number: 5,734,144
[45] Date of Patent: Mar. 31, 1998

[54] PLASMA ARC WELDING METHOD AND APPARATUS IN WHICH A SWIRLING FLOW IS IMPARTED TO A PLASMA GAS TO STABILIZE A PLASMA ARC

[75] Inventors: Yoshihiro Yamaguchi; Iwao Kurokawa; Masamitsu Kitahashi; Mikio Minonishi, all of Kanagawa-ken, Japan

[73] Assignee: Kabushiki Kaisha Komatsu Seisakusho, Japan

[21] Appl. No.: 525,530

[22] PCT Filed: Mar. 25, 1994

[86] PCT No.: PCT/JP94/00484

§ 371 Date: Sep. 12, 1995

§ 102(e) Date: Sep. 12, 1995

[87] PCT Pub. No.: WO94/22630

PCT Pub. Date: Oct. 13, 1994

[30] Foreign Application Priority Data

Mar. 26, 1993 [JP] Japan ................... 5-068075

[51] Int. Cl.[6] ........................................... B23K 10/00
[52] U.S. Cl. ................... 219/121.46; 219/121.51; 219/121.55; 219/127
[58] Field of Search ................... 219/137.2, 127, 219/73, 73.1, 121.45, 121.46, 121.59, 121.55, 121.48, 121.51

[56] References Cited

U.S. PATENT DOCUMENTS

| 4,929,812 | 5/1990 | Ivamikov et al. ............ 219/137.2 |
| 5,532,453 | 7/1996 | Scheller ...................... 219/127 |

FOREIGN PATENT DOCUMENTS

| 0480034 | 4/1992 | European Pat. Off. |
| 53-94240 | 8/1978 | Japan. |
| 57-94473 | 6/1982 | Japan. |

Primary Examiner—Mark H. Paschall
Attorney, Agent, or Firm—Ronald P. Kananen

[57] ABSTRACT

There is provided a plasma arc welding method, characterized in that a portion of a front side workpiece material is heated and melted by a plasma arc to form a molten pool thereat, that the molten pool is held not to fall or drop under a surface tension acting thereto and is brought into contact with a portion of a rear side workpiece material under a pressure which is exerted by the plasma arc and/or a shielding gas, further that the portion of the said rear workpiece material is brought into a molten state by a thermal conduction thereto so that the two workpiece materials may be welded together, and that a swirling flow is imparted to a plasma gas of the plasma arc. There is also provided a plasma welding apparatus for using the above mentioned plasma arc welding method, characterized in that the apparatus comprises: a plasma torch which has a plasma flushing outlet for swirling and flushing a plasma gas of the plasma arc around an electrode therefor.

8 Claims, 6 Drawing Sheets

PLASMA ARC WELDING METHOD AND APPARATUS IN WHICH A SWIRLING FLOW IS IMPARTED TO A PLASMA GAS TO STABILIZE A PLASMA ARC

TECHNICAL FIELD

The present invention relates to a plasma arc welding method of welding together a plurality of plate materials laid one over another and also to an apparatus for carrying out this method.

BACKGROUND ART

The plasma arc welding technique, especially, the plasma arc spot welding technique is favorably comparable with the conventional electrical resistance spot welding technique in that because of its ability to weld from one side, it is advantageously capable of dealing with large-sized workpieces as well as workpieces which are of an irregular configuration. For this reason, a research and development work has hitherto been extensively conducted for the plasma arc welding technique in respect of a variety of phases thereof.

In the conventional typical plasma spot welding technique, however, while a so-called thermal conducting process, i.e. a process in which workpiece materials are welded together by the thermal conduction of an arc heat, has inherently been adopted, due to an insufficient stability encountered in the plasma arc, a molten pool in a front side workpiece material may not stably be brought into contact with a rear side workpiece material. Accordingly in this technique, certain disadvantages have arisen that can be listed as follows:

(1) The weld penetration is shallow and is problematical in the resultant welding strength;

(2) The welding is susceptible of being influenced from a spacing which is formed between workpiece materials placed one over another to bring about a large fluctuation in the degree of a weld penetration formed, resulting in a lack of stability in the quality of a weld; and (3) It takes too long in time to weld together thick workpiece materials which are large in a thermal capacity thereof. Hence, being encountered with a problem arising in the reliability in the quality of a weld, the plasma arc welding technique has seldom been utilized in a workpiece welding operation in which the welding strength is especially important.

In an attempt to resolve this problem, the prior art has adopted as another technique a plasma arc spot welding method as disclosed in Japanese Unexamined Patent Publication No. Sho 51-142456 in which in spot-welding together two or more workpieces laid one over another, in addition to the use of a plasma arc in order to melt the workpiece materials by heating them, a keyhole action of the plasma arc is utilized to cause the plasma arc to completely penetrate into a rear side of a rear side workpiece material so as to allow the weld penetration formed to be reached thereto.

In FIG. 1 there is shown the sequence of a plasma arc spot welding method as set forth in the above noted prior art publication.

According to such a method, after a plasma arc 2 has first been generated by means of a torch 1, (1) A molten pool is formed in a front side workpiece material 3a;

(2) An excavation in the workpiece material 3a is initiated by means of the plasma arc 2;

(3) The excavation is brought about in both the workpiece material 3a and a rear side workpiece material 3b;

(4) The plasma arc 2 is penetrated to a rear side of the rear side workpiece material 3b to form a keyhole extending through the two workpiece materials 3a and 3b;

(5) By controlling a welding current, a plasma gas flow rate and so forth, the keyhole is closed; and (6) The arc is terminated to end the welding operation. By performing a spot welding operation of keyhole type in the foregoing sequence, a weld penetration as formed will be reached into the rear sides of the workpiece materials 3a and 3b so as to form a complete nugget therein. Yet, since the weld penetration obtained is deep in this method, the technique can be applied to comparatively thick workpiece materials.

In a welding method of keyhole type in the above mentioned prior art, however, there arise inconveniences such as:

(1) As shown in FIG. 2, when the keyhole process is used for thin plate workpieces 3a and 3b, a material may be blown off; consequently, since a portion which is of a weak strength may be created, or a blow-hole may be formed, the quality of a weld will not be stabilized;

(2) Since for thick workpieces the plasma arc needs to penetrate therethrough, a plasma unit which is of a considerably large output will be required; and (3) Since a keyhole is formed, a product will have an appearance quality that is inferior to those obtained by the above mentioned thermal conduction process.

SUMMARY OF THE INVENTION

With the foregoing in mind, it is a primary object of the present invention to provide a plasma arc welding method as well as an apparatus for carrying out the same whereby a deep weld penetration welding operation is achieved without creating a keyhole; there is less susceptibility of being influenced from a spacing which may be formed between workpiece materials placed one over another; a stabilized welding operation can be achieved at all times; and a welding operation can be attained with an apparatus which is of a comparatively small output, even for thick workpieces and in a relatively short period of time.

In order to achieve the above mentioned object, there is provided in accordance with the present invention, in a first construction thereof, a plasma arc welding method, characterized in that a portion of a front side workpiece material is heated and melted by a plasma arc to form a molten pool thereat, that the said molten pool is held not to fall or drop under a surface tension acting thereto and is brought into contact with a portion of a rear side workpiece material under a pressure which is exerted by the said plasma arc and/or a shielding gas, further that the said portion of the said rear side workpiece material is brought into a molten state by a thermal conduction thereto so that the said two workpiece materials may be welded together, and that a swirling flow is imparted to a plasma gas of the said plasma arc.

According to the foregoing construction, with a swirling flow imparted to the plasma gas, it follows that a stability of the plasma arc can be maintained even with a plasma gas flow rate which is less than in the prior art and that for this reason a molten pool in the front side workpiece material can stably be brought into contact with the rear side workpiece material. As a result, the thermal conduction required is accomplished efficiently and with certainty.

In addition to the above mentioned construction, the above mentioned method preferably includes a feature that in the step in which the said molten pool of the said front side workpiece is brought into contact with the said rear side workpiece material, the said pressure which is exerted by the said plasma gas and/or the said shielding gas is adjusted by controlling at least one of a flow rate of the said plasma gas, a flow rate of the said shielding gas, a plasma welding current magnitude and a standoff in accordance with a particular quality of the said front side workpiece material and a particular spacing in size which is formed between the said two workpiece materials.

According to the foregoing construction, the said molten pool of the front side workpiece material is still more stably brought into contact with the rear side workpiece material.

Further, it has been discovered that in addition to the above mentioned construction, if the said plasma gas flow rate with respect to the the welding current magnitude which is determined by quality of the said front side workpiece material and the welding bonded area (i. e. the welding strength) is controlled so as to lie within a particular range in the above mentioned method, a plasma arc welding operation can be performed with a stability and that as a result a plasma welding operation is made possible even for a thick plate workpiece material.

It has been found that the above mentioned range has an above mentioned plasma gas flow rate of 2 to 5.6 liters/min when the above mentioned plasma welding current magnitude lies between 40 to 100 amperes.

The present invention also provides, in a second construction thereof, a plasma arc welding apparatus in which a portion of a front side workpiece material is heated and melted by a plasma arc to form a molten pool thereat, the said molten pool is held not to fall or drop under a surface tension acting thereto and is brought into contact with a portion of a rear side workpiece material under a pressure which is exerted by the said plasma arc and/or a shielding gas and further in which the said portion of the said rear side workpiece material is brought into a molten state by a thermal conduction thereto so that the said two workpiece materials may be welded together, the said apparatus comprising a plasma torch which has a plasma flushing outlet for swirling and flushing a plasma gas of the said plasma are around an electrode therefor.

In addition to the above mentioned construction, the above mentioned apparatus preferably comprises: an articulated robot for supporting the said plasma torch, a plasma power supply connected to the said electrode, a gas supply source connected to the said plasma flushing outlet, and a shielding gas flushing outlet disposed around the gas flushing outlet of the said plasma torch and connected to the said gas supply source or another gas supply source, and is further provided with a control unit for controlling at least one of an operation of the said articulated robot, an electric current from the said plasma power supply and a flow rate of the said plasma gas and/or a flow rate of the said shielding gas from the said gas supply source.

BRIEF EXPLANATION OF THE DRAWINGS

The present invention will better be understood from the following detailed description and the drawings attached hereto showing certain illustrative embodiments of the present invention. In this connection, it should be noted that such embodiments as illustrated in the accompanying drawings are intended in no way to limit the present invention, but to facilitate an explanation and understanding thereof.

In the accompanying drawings.

BEST MODES FOR CARRYING OUT THE INVENTION

Figure 1:
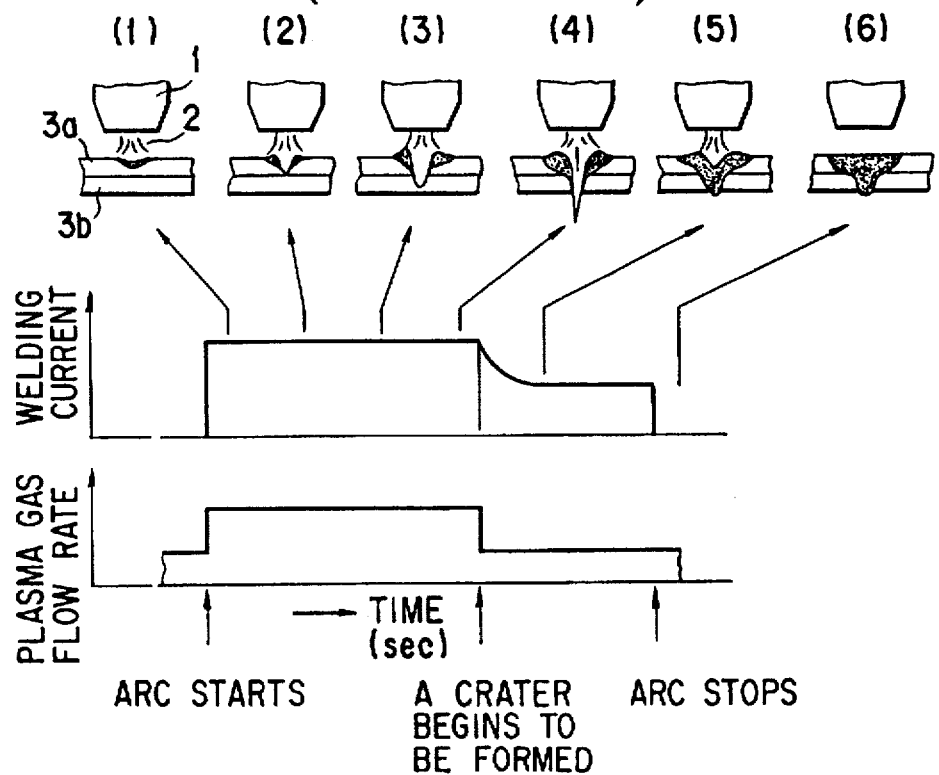
FIG. 1 is a schematic sequence diagram illustrating a conventional plasma arc spot welding method.
Figure 2:
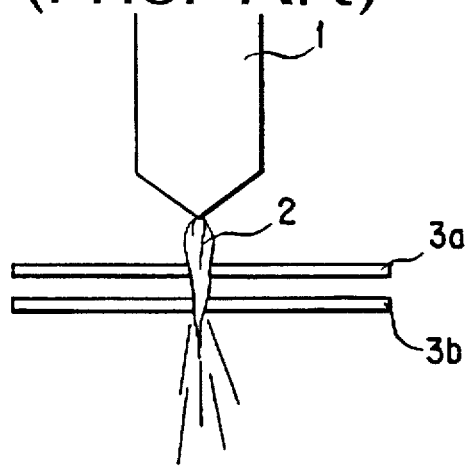
FIG. 2 is a schematic diagram illustrating a state in which a keyhole is formed through thin plate workpiece materials in accordance with the above mentioned conventional method.

Hereinafter, suitable embodiments of the present invention with respect to a plasma arc welding method and an apparatus for carrying out the same will be set out with reference to the accompanying drawings.

In FIGS. 3(a) to 3(d), there is shown a schematic sequence where one embodiment of a spot welding method according to the present invention is carried out. The steps which are involved in this sequence are listed below.

(1) As shown in FIG. 3(a), a plasma arc 2 is projected out of the plasma torch 1 to heat up one of two plate materials placed one over the other, viz. a front side plate material 3a which is disposed proximate to the plasma torch 1 to form a molten pool 4 at a portion of the front side plate material 3a. In this step, a shielding gas 2a is also flushed out.

(2) As shown in FIG. 3(b), while being retained not to fall or drop under a surface tension acting thereto, this pool 4 is brought into contact with a rear side plate material 3b under a pressure which is exerted by the plasma arc 2 and/or a shielding gas 2a.

It should be noted at this point that the pressure exerted by the plasma arc 2 and/or the shielding gas 2a is then adjusted by controlling at least one of a flow rate of the plasma gas, a flow rate of the shielding gas and a standoff (i. e. a parameter which represents a spacing between the frontal end of the plasma torch 1 and the surface of the front side workpiece material 3a ) in accordance with a particular quality of the front side workpiece material 3a and a particular spacing in size between the two workpiece materials 3a and 3b to bring the portion of the molten pool 4 in a stabilized state of the front side workpiece material 3a into contact with the rear side workpiece material 3b side.

(3) As shown in FIG. 3(c), through a thermal conduction, the rear side plate material 3b is thoroughly heated up and molten with the weld penetration formed arriving to the rear side of the rear side plate material 3b.

(4) Finally, as shown in FIG. 3(d), the plasma arc 2 and the shielding gas 2a are terminated to end the welding operation.

And, the welding conditions in this case are listed in a Table 1 below. In this connection, it should be noted that the nugget diameters shown in Table 1 represent the diameters of the welding bonded areas in plasma spot welding operations.

TABLE 1

| Items | Conditions |
| --- | --- |
| Welding Current Magnitude | 90A |
| Plasma gas | Ar + $H_2$ 10% Flow rate 1.5–6.0 l |
| Shielding gas | Ar + $H_2$ 10% Flow rate 2.0–3.0 l |
| Upper Workpiece Material | Material SPC Thickness t 2.3 |
| Lower Workpiece Material | Material SPC Thickness t 1.8 |
| Welding Time | 5.3 sec (Nugget diameter ∅ 6.0) 8.7 sec (Nugget diameter ∅ 9.0) |
| Nozzle Diameter | ∅ 4.0 |

In an plasma arc welding operation which is carried out in the foregoing sequence in accordance with the present invention, where a swirling flow is imparted to the plasma gas, it has been found that a stability of the plasma arc can be maintained even with a flow rate of the plasma gas which is less than in the prior art and that for this reason the molten pool 4 in the front side workpiece material 3a can be stably brought into contact with the rear side workpiece material 3b. As a result, it follows that since the thermal conduction required is accomplished efficiently and with certainty, a plasma welding operation with a deep weld penetration formed is made possible.

Also, since in the step (2) the pressure which is exerted by the plasma jet 2 and the shielding gas 2a is adjusted by controlling at least one of the flow rate of the plasma gas, the flow rate of the shielding gas, the plasma welding current magnitude and the standoff in accordance with a particular quality of the front side workpiece material 3a and a particular spacing in size between the two workpiece materials 3a and 3b to bring the molten pool 4 in a stabilized state of the front side workpiece material 3a into contact with the rear side workpiece material 3b, it follows that the said molten pool 4 can be still more stably brought into contact with the rear side workpiece material 3b.

Further, it has been found from a variety of experiments that for a plasma current magnitude which is determined by the front side workpiece material 3a and the welding bonded area (i. e. the welding strength), there is a range of the plasma gas flow rate in which an above mentioned plasma welding operation can be carried with a stability and that a plasma welding operation is made possible for any particular plate thickness of the workpiece material 3a whatsoever by acquiring those welding conditions which are commensurate with such a range of the gas flow rate.

More specifically, in case a preselected current magnitude is set for a certain plate thickness, an excessive plasma gas flow rate will bring about a so-called keyhole state in which the intensity of the plasma arc becomes excessive to the extent that a hole may be formed in a workpiece material. Also, if the plasma gas flow rate is too low, the input amount of heat into a workpiece material will be deficient to the extent that a weld penetration deficiency may take place.

Accordingly, by selecting a range for the plasma gas flow rate which is suitable to prevent the above mentioned inconveniences, a favorable welding operation can be carried out for any particular plate thickness, whatsoever, of a workpiece material.

Figure 4:
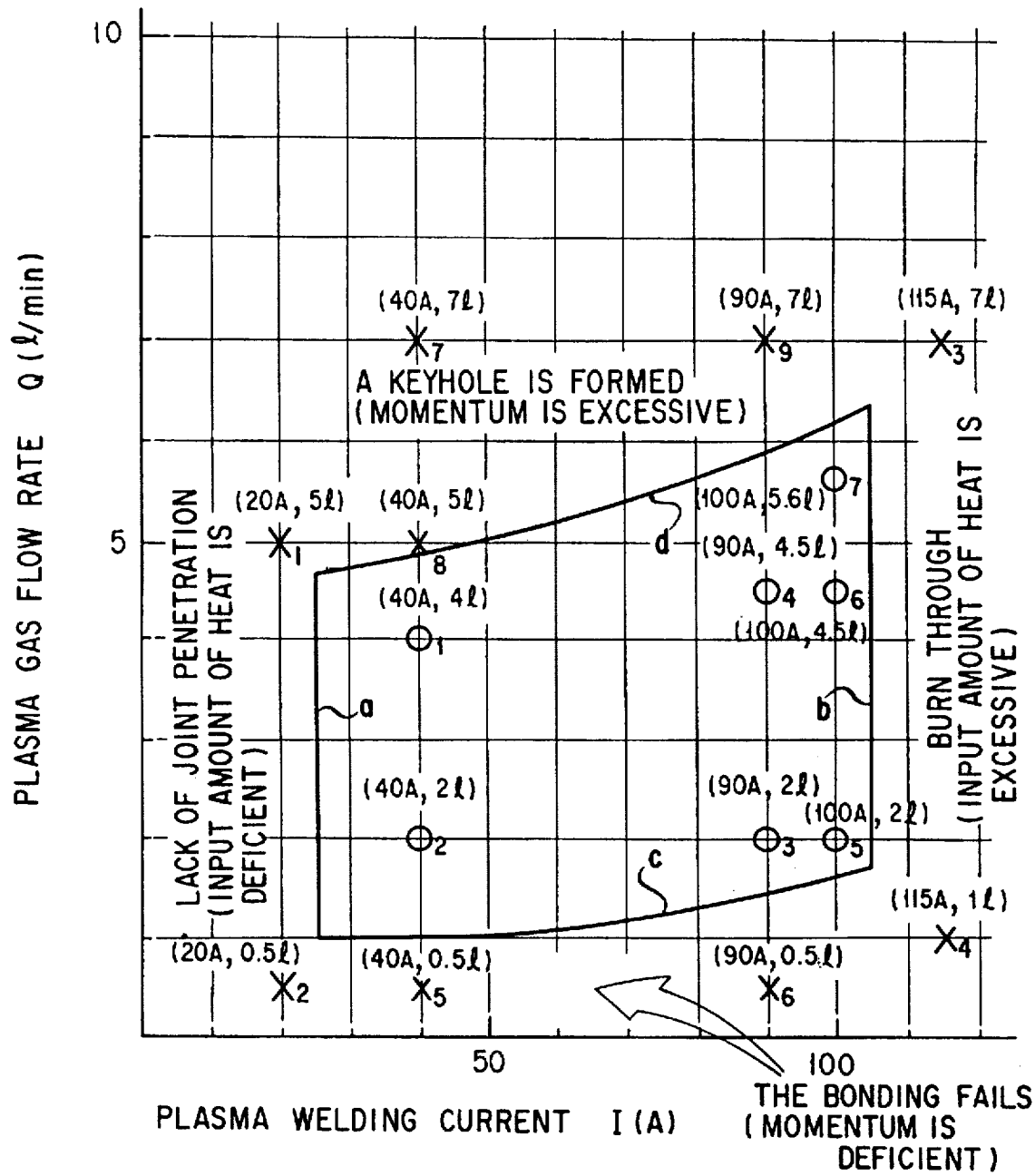
FIG. 4 is a graph demonstrating such a range of the plasma gas flow rate in regard to the plasma welding current magnitude that a plasma welding operation can be carried out with a stability in accordance with the above mentioned method and apparatus.

The relationship of a plasma gas flow rate with a suitable plasma welding current magnitude in the present embodiment is expressed by a graph as shown in FIG. 4. Thus, it has been demonstrated that a welding operation that is stable at all times can be carried out in a particular range as shown in FIG. 4.

The respective points plotted in the graph of FIG. 4 are shown with the plasma welding current I and the plasma gas flow rate Q taken as parameters in each experimentation. In the graph, the symbols ○ and x show sensually determined results in discriminating a welding finished quality and designate "good" and "bad", respectively.

In these respective experimental examples, at $X_1$ and $X_2$, the current I was so low that the input amount of heat into a workpiece material was deficient, resulting in a bad weld penetration formed which yielded an unstable bond.

In another example, at $X_3$ and $X_4$, the input amount of heat, in contrast to the above, were excessive, resulting in a burn through of the molten pool 4 to the extent that a hole was formed in the workpiece material 3a.

At $X_5$ and $X_6$, unlike at $X_2$ and $X_4$, while the input amount of heat was appropriate, the gas flow rate was deficient, resulting in a failure to eliminate the spacing between the workpiece materials 3a and 3b which yielded a bad bond.

At $X_7$, $X_8$ and $X_9$, in contrast to the preceding, the gas flow rate was so excessive that the molten pool 4 was thrusted outwards by the plasma gas and the welding portion was formed with a cratered surface, resulting in the formation of a keyhole.

For the above mentioned $X_1$ to $X_9$, at each of $O_1$ to $O_7$, a good quality spot weld was formed. And, from these experiments, there was obtained a range as shown in FIG. 4 in which a stable welding operation can be carried out.

Specifically, it has been found that the lower limit line a for the appropriate plasma welding current I can be set up at 25A from $X_1$ and $X_2$ as well as $O_1$ and $O_1$.

Also, it has been found that the upper limit line b for the appropriate plasma welding current I can be set up at 105A from $X_3$ and $X_4$ as well as $O_5$, $O_6$ and $O_7$.

On the other hand, the lower limit line c for the appropriate plasma gas flow rate Q is determined from $X_5$ and $X_6$ as well as $O_2$, $O_3$ and $O_5$ and assumes a curved line rising upwards in the right hand direction. The reason for this is that as the plasma welding current I is increased, a double arc tends to be generated since the gas flowing along the internal surfaces of the nozzle is deficient in its insulation unless the plasma gas flow rate is increased.

Further, it has been found that the upper limit line d can be established from $X_7$, $X_8$ and $X_9$ as well as $O_1$, $O_4$ and $O_7$. As the plasma gas flow rate Q is increased, as mentioned above, the momentum of the gas will be so increased as to thrust the molten portion outwards and to cause it to be sunk in the form of a crater. However, at a portion at which the plasma welding current I is high, there being so large input amount of heat as to be a low viscosity of the weld, the above mentioned crater portion will be returned to a plain surface after the heat input is terminated. For this reason, the upper limit line d of this appropriate plasma gas flow rate Q will assume a curve rising in the right hand direction.

From the above mentioned experimental results, the date for $O_1$, $O_2$, $O_3$, $O_5$, $O_6$ and $O_7$ which lie within the range in which a stabilized welding operation can be carried out are given as shown in Tables 1 and 2 below.

In Table 2, there is shown a case for $O_1$ in which the plasma welding current I is 40 A and the plasma gas flow rate Q is 4 liters/min.

In Table 3, there are shown a case for $O_2$ in which the plasma welding current I is 40 A and the plasma gas flow rate Q is 2 liters/min, a case for $O_3$ in which the plasma welding current I is 90 A and the plasma gas flow rate Q is 2 liters/min, a case for $O_5$ in which the plasma welding current I is 100 A and the plasma gas flow rate Q is 2 liters/min, a case for $O_6$ in which the plasma welding current I is 100 A and the plasma gas flow rate Q is 4.5 liters/min and a case for $O_7$ in which the plasma welding current I is 100 A and the plasma gas flow rate Q is 5.6 liters/min.

TABLE 2

| Plate thickness (mm) | | Nozzle Spacing (mm) | Nozzle diameter (mm) | Electric current (A) | Gas composition | Flow rate (l/min) | | S.O. Stand-off (mm) | Time (Second) | Welding qualities | | | | | | |
|---|---|---|---|---|---|---|---|---|---|---|---|---|---|---|---|---|
| Upper | Lower | | | | | Main | Assist | | | Crack | Undercut | Pits | Smoothness | Nugget diameter | Tensile strength | Remarks |
| $O_1$ | | | | | | | | | | | | | | | | |
| 0.8 | 0.8 | 0 | φ3.0 | 40 | Ar + $H_2$ ($H_2$ 20%) | 4.0 | 6.0 | 6.5 | 0.8 | None | None | None | o | JIS A-class | No data JIS A-class | If the spacing is reduced to 0 in |
| | | 0.2 | | | | | | | 1.2 | | | | −*1 | | | |
| | 1.2 | 0 | | | | | | | 1.4 | | | | o | | No data | the conditions for the |
| | 1.6 | | | | | | | | 2.2 | | | | o | | | spacing 0.2, a keyhole is formed. |
| 1.2 | 0.8 | 0 | | | | | | | 2.5 | | | | o | | No data | If the spacing is reduced to 0 in |
| | 1.2 | 0 | | | | | | | 2.3 | | | | o | | | |
| | | 0.5 | | | | | | | 2.8 | | | | −*1 | | | |
| | 1.6 | 0 | | | | | | | 3.5 | | | | o | | | the conditions for the spacing 0.5, a keyhole is formed. |
| 1.6 | 0.8 | 0 | | | | | | | 2.8 | | | | o | | No data | If the spacing is reduced to 0 in |
| | 1.2 | | | | | | | | 3.8 | | | | o | | | |
| | 1.6 | 0 | | | | | | | 5.2 | | | | o | | | the conditions for the |
| | | 0.5 | | | | | | | 6.0 | | | | −*1 | | | spacing 0.5, a keyhole is formed. |

Mild steel plates (SPC material)
*1: A recess having a depth that corresponds to the spacing is formed.

TABLE 3

| | Plate thickness (mm) | | Nozzle diameter (mm) | Electric current (A) | Gas composition for use | | Flow rate [l/min] | | Stand-off mm | Welding time Sec | Post-applied jet | Stability Estimates of welding qualities | | | | Nugget diameter | Remarks |
|---|---|---|---|---|---|---|---|---|---|---|---|---|---|---|---|---|---|
| | Upper | Lower | | | Plasma | Shielding | Plasma | Shielding | | | | Crack | Undercut | Pits | Smoothness | | |
| $O_3$ | 0.8 | 0.8 | φ4.0 | 90 | Ar + $H_2$ (7%) | | 2.0 | 3.0 | 6.5 | 0.8 | None | o | o | o | o | 4.7~5.0 | JIS A-class |
| $O_2$ | | | φ3.0 | 40 | Ar + $H_2$ (20%) | | | | | 1.8 | | o | o | o | o | about 4.9 | JIS A-class |
| | | | | | | | | | | 0.7 | | o | o | Δ | Δ | about 4.1 | Small pits existing |
| $O_2$ | 1.2 | 1.2 | φ3.0 | 40 | Ar + $H_2$ (7%) | | 2.0 | 3.0 | 6.5 | 5.0 | None | o | o | o | o | 5.7~6.1 | JIS A-class |
| | | | | | Ar + $H_2$ (20%) | | | | | 2.5 | | o | o | o | o | 4.2~4.6 | Small nugget |
| $O_3$ | 1.6 | 1.6 | φ4.0 | 90 | Ar + $H_2$ (7%) | | 2.0 | 3.0 | 6.5 | 4.0 | None | o | o | o | o | 5.9~7.0 | JIS A-class |
| $O_2$ | | | φ3.0 | 40 | Ar + $H_2$ (20%) | | | | | 12.0 | | o | o | o | Δ | 5.0~6.4 | |
| | | | | | | | | | | 6.0 | | o | o | Δ | Δ | 5.7~6.8 | Small pits existing |
| $O_5$ | 1.6 | 1.6 | φ4.0 | 100 | Ar + $H_2$ (7%) | | 2.0 | 3.0 | 6.5 | 3.5 | None | o | o | o | o | 5.9~6.8 | JIS A-class |
| $O_6$ | ↑ | ↑ | ↑ | ↑ | ↑ | | 4.5 | 7.0 | ↑ | 2.5 | ↑ | o | o | o | Δ | 5.7~6.8 | |
| $O_7$ | ↑ | ↑ | ↑ | ↑ | ↑ | | 5.6 | 10.0 | ↑ | 2.0 | ↑ | o | o | o | Δ | 6.0~7.0 | JIS A-class |

Mild Steel plates(SPC material)
[Estimation] Estimates at N = 2, o:Good, Δ:Fair, *:Failure(a bit unacceptable)

Now, with reference to FIGS. 5 through 8, an explanation will be given below in regard to a certain embodiment of the plasma welding apparatus according to the present invention for carrying out the above mentioned method.

Figure 5:
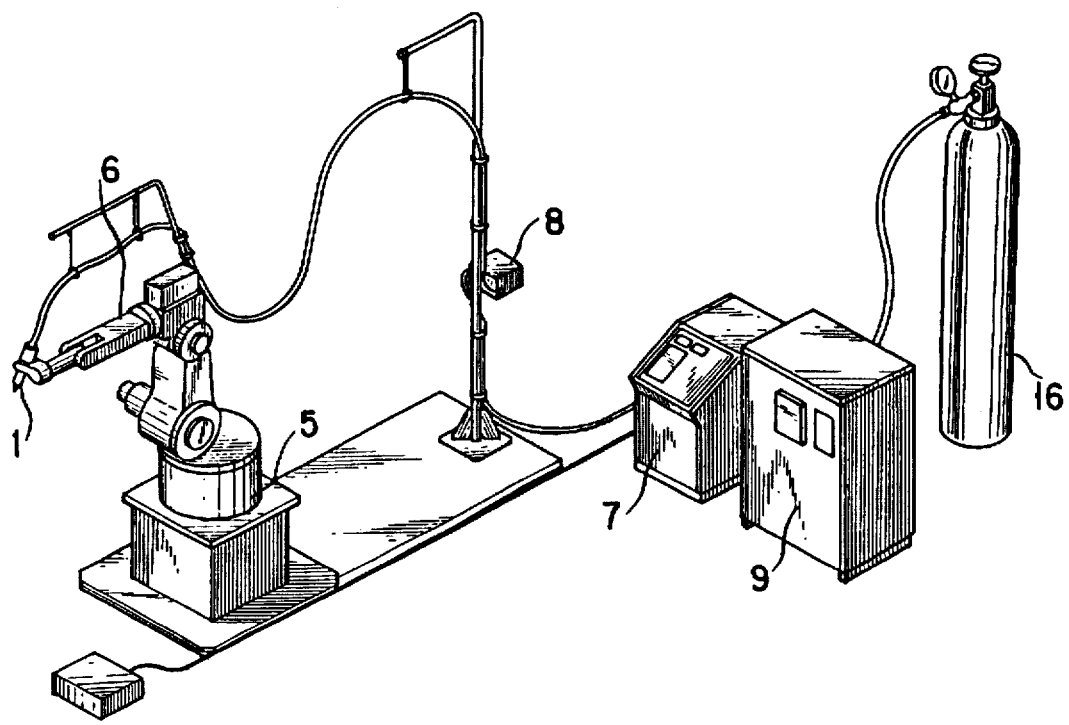
FIG. 5 is a perspective view illustrating one embodiment of an apparatus for using the above mentioned method according to the present invention.

In FIG. 5, there is shown in a perspective view an embodiment of the plasma arc welding apparatus, in which an articulated robot 5 is utilized of which a robot arm 6 has at a frontal end thereof a plasma torch 1 mounted thereon. More specifically, by virtue of the articulated robot 5, the plasma torch 1 is here adapted to meet with an omnidirectional welding operation. Numeral 7 designates a plasma welding power supply for supplying an electric current to an electrode of the plasma torch 1 via a high frequency box designated at 8. Numeral 16 denotes a gas cylinder for supplying a gas such as argon plus hydrogen into a plasma gas flushing outlet and a shielding gas passage of the plasma torch 1. It should be noted here that the plasma gas flushing outlet and the shielding gas passage of the plasma torch 1 may alternatively be supplied with different gases, respectively, which are fed from separate gas cylinders. Numeral 9 represents a control unit for controlling the flow rate of the plasma gas, the flow rate of the shielding gas, the plasma welding magnitude and the standoff.

Figure 6:
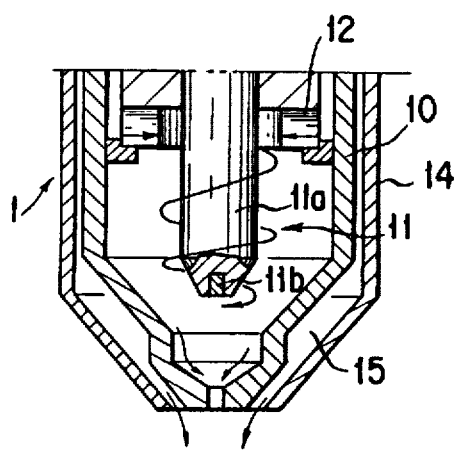
FIG. 6 is a cross sectional view in elevation illustrating an essential portion of a plasma torch which is incorporated in the above mentioned apparatus.
Figure 7:
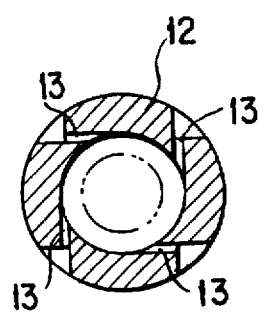
FIG. 7 is a horizontal cross sectional view illustrating a swirler that is incorporated in the above mentioned plasma torch.

The above mentioned plasma torch 1 is constructed as shown in FIG. 6. An electrode 11 provided in a nozzle 10 has a base portion thereof provided with a swirler 12, by which a plasma gas is caused to flow in a strong swirling stream out towards a frontal end of the electrode 11. The above mentioned swirler 12 is constructed as shown in FIG. 7 and is thus provided with a plurality of gas flushing outlets 13 which are oriented in tangential directions relative to a space surrounding the electrode 11. Each flushing outlet 13 is oriented orthogonally to an axis of the electrode 11, or is inclined slightly towards the frontal end side of the electrode 11. Numeral 14 designates a shielding cap which is interiorly formed with a shielding gas passage 15 through which a shielding gas is flushed out. The above mentioned electrode 11 has a holder 11a composed of copper and has at its frontal end an electrode rod 11b embeded therein and composed of tungsten.

In the present embodiment, it has been found that the relationship of the plasma gas flow rate to the plasma welding current magnitude, which allows a plasma welding operation to be carried out stably at all times, is given as shown by the graph of FIG. 4 which is described above.

Figure 3:
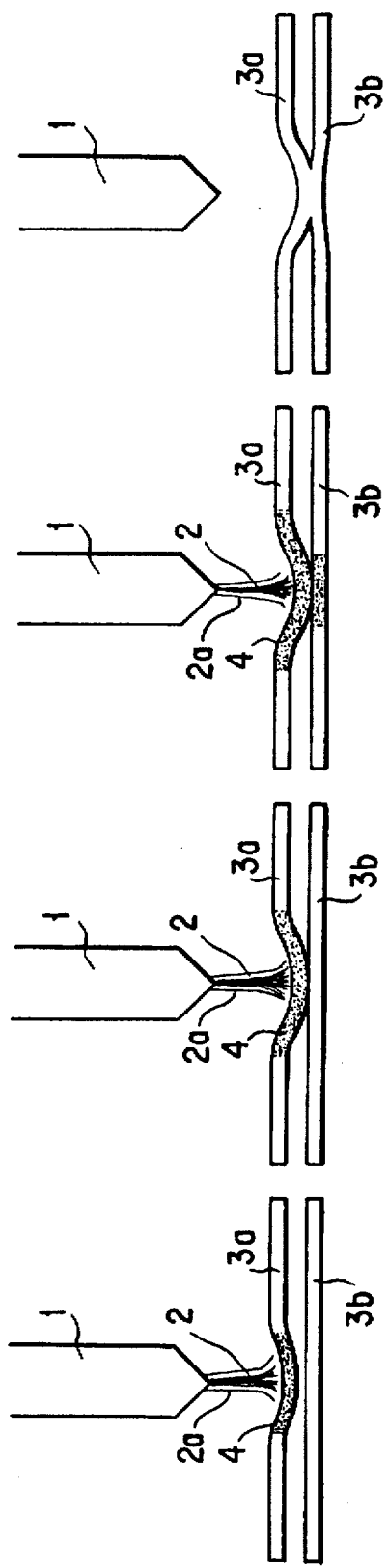
FIGS. 3(a) to 3(d) provide is a schematic sequence diagram illustrating one embodiment of a plasma arc welding method according to the present invention.

Further in the present embodiment, it has been found that if in the step (2) shown in FIG. 3 the pressure that is exerted by the plasma arc onto the molten pool 4 is adjusted by controlling the standoff in accordance with the particular quality of the front side workpiece material 3a and the particular spacing in size between the two workpiece materials 3a and 3b, this molten pool 4, made into a stabilized state, can be brought into contact with the rear side workpiece material 3b.

The principle underlining the foregoing is set forth below with FIG. 8(a) to 8(c) taken as an example.

Figure 8A:
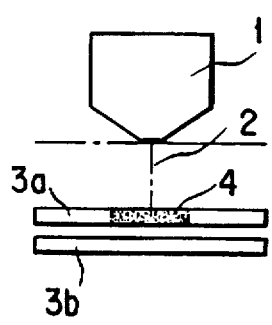
FIGS. 8(a) to 8(c) provide is a schematic sequence diagram illustrating a standoff control which may be carried out in the above mentioned apparatus.
Figure 8B:
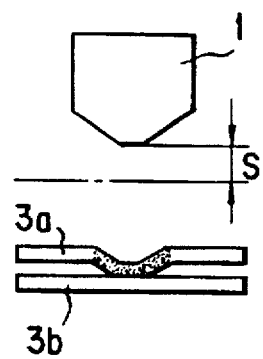
Figure 8C:
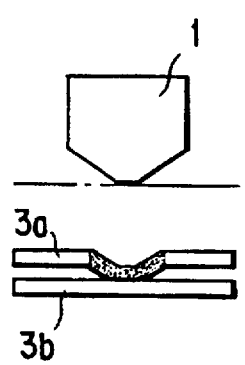

First, the sequence which controls the standoff is:

(1) As shown in FIG. 8(a), a molten pool 4 is made up in the front side workpiece material 3a;

(2) As shown in FIG. 8(b), the standoff is increased by an amount of displacement S to bring the molten pool 4 of the front side workpiece material 3a into contact with the rear side workpiece material 3b; and (3) As shown in FIG. 8(c) the standoff is returned to the original upon the molten pool 4 of the front workpiece material 3a having completely contacted with the rear side workpiece material 3b.

The progresses of the respective steps (1) and (2) mentioned above are all administered with the lapses of time since the commencement of the welding operation. And, the standoff conditions in the respective steps each in obtaining a nugget of a diameter of 6 mm and the times of completion in the steps (1) and (2) are listed in Table 4 below.

TABLE 4

|  | Nugget diameter ⌀ 6.0 |
| --- | --- |
| Standoff (1) (3) | 6.5 mm |
| Standoff (2) | 8.5 mm |
| (1) Time of completion | 2 seconds |
| (2) Time of completion | 4 seconds |

Next, the principle for the fact that the pressure of a plasma arc can be adjusted by controlling the stand off will be set out below.

Let it be assumed that the plasma current magnitude (i.e. welding current magnitude) is I, the plasma voltage is $V_1$, the particle velocity of the plasma arc is $V_2$ and the temperature of the plasma arc is T. Then, since the temperature of the plasma arc is proportional to the loaded electric power to the plasma unit, $$T = a \times I \times V_1 \text{ (where a is a constant)} \quad (1)$$

Next, since the kinetic energy of the particles of the plasma arc is proportional to the temperature of the plasma arc, $$V_2^2 = b \times T \text{ (where b is constant)} \quad (2)$$

Assuming that the plasma current is constant, it can be seen that the equations (1) and (2) yield:

$$V_2 = c \times V_1^{1/2} \text{ (where c is a constant)} \quad (3)$$

demonstrating that the velocity of the plasma arc particles is proportional to the square root of the plasma voltage. Also, in view of the fact that the pressure of the plasma arc is proportional to the velocity of the plasma arc particles and that the plasma voltage is proportional to the standoff, it is seen that the pressure of the plasma arc can be adjusted by controlling the standoff.

At this point it should be noted that while in the embodiment mentioned above the pressure of the plasma arc is adjusted by controlling the standoff, a similarly favorable result has been obtained by controlling the plasma gas flow rate, the shielding gas flow rate or the plasma current magnitude instead of the standoff.

In the embodiment mentioned above, since the plasma torch 1 is provided with the swirler 12 that as noted above is designed to flush the plasma gas in a strong swirling flow around the electrode 11, the arc stability can be maintained even if the frontal end of the electrode 11 has worn away. For this reason, an electrode can be used having a cylindrical tungsten tip embeded in a copper holder thereof. Alternatively, an electrode may also be used having a hafnium tip embeded in the copper holder thereof. Also, if the tungsten tip is then centrally provided with a hole, the arc stability can be increased. Also in this instance, even if the plasma gas flow rate is reduced, the arc can be maintained; and it is thus possible to reduce the pressure that acts on the molten metal.

Also, in the conventional plasma arc welding apparatus in which the electrode is composed of tungsten, it has not been possible to make use of a gas containing the oxygen atom as the plasma gas. In the embodiment mentioned above, however, an inexpensive gas such as carbon dioxide can advantageously be used as the plasma gas by virtue of the fact that a swirling flow may be imparted to the plasma gas and that the electrode may have its hafnium tip embedded in its copper holder. It should be interesting to note here that a form of the nozzle orifice of the above mentioned plasma torch 1 is preferably of a configuration which satisfies the relationship:

$$1 \leq L/D \leq 3$$

where L and D are the length and the diameter of the nozzle, respectively. The reasons for this are set out below. As the nozzle passed by a swirling flow is thinner and longer (L/D>3), its momentum in the swirling direction will be attenuated due to its contact resistance with the nozzle wall surfaces and the pressure acting on the molten metal will be increased by the amount of attenuation due to the axial flow. Also, as the nozzle is thicker and shorter (1>L/D), the arc squeeze will be insufficient, the heat will be less concentrated onto the welding materials, the extent of thermal influence will be increased and it will take longer in time to weld the workpiece materials.

While the above mentioned form of embodiment has been illustrated with particular respect to a spot welding operation, the foregoing features can equally be applied to a linear welding operation which represents a form in which spot welding operations are connected together infinitely.

As described in the foregoing, in accordance with the present invention, it has been made possible to retain the advantages which are peculiar to a plasma arc welding process while permitting a welding process to be performed so as to form a deep weld penetration and without creating a keyhole. Also, by utilizing a surface tension acting on a molten pool, there will be less susceptibility of being influenced by a spacing between workpiece materials which are placed one over another. Hence a constantly stable welding operation can be carried out. Also, because of the ability not to create a keyhole, a material will not be blown off and hence even thin workpiece materials will be capable of yielding welded products which are highly stable in the welding strength and whose welding quality is also superior in the appearance. In addition, since the plasma arc is not required to penetrate through the workpiece materials, the energy required for the plasma arc welding apparatus need only be of a capacity just to melt only a welding area of the workpiece materials and this allows a welding operation to be carried out with an apparatus which is of a comparatively small capacity and also to be performed for even thick plate workpiece materials in a relatively short period of welding time. Furthermore, in regard to a plasma current magnitude which is determined by workpiece materials, the development of a particular range for the plasma gas flow rate with which a plasma welding operation is accomplished with a stability has enabled a plasma welding process to be attained for any particular workpiece plate thickness whatsoever.

While the present invention has hereinbefore been described with respect to certain illustrative embodiments thereof, it will readily be appreciated by a person skilled in the art to be obvious that many alterations thereof, omissions therefrom and additions thereto can be made without departing from the essence and the scope of the present invention. Accordingly, it should be understood that the present invention is not limited to the specific embodiments thereof set out above, but includes all possible embodiments thereof that can be made within the scope with respect to the features specifically set forth in the appended claims and encompasses all equivalents thereof.

INDUSTRIAL APPLICABILITIES

As set forth in the foregoing, a plasma arc welding method and an apparatus for carrying out this method according to the present invention are extremely useful in welding together a plurality of workpiece materials which are placed one over another.

What is claimed is:

1. A plasma arc welding method for welding together a front side workpiece material and a rear side workpiece material which are spaced apart from each other, characterized in that a portion of said front side workpiece material is heated and melted by a plasma arc to form a molten pool thereat, that said molten pool at said portion is held not to drop under a surface tension acting thereto, that said molten pool so held not to drop is brought into contact with a portion of said rear side workpiece material under a pressure which is exerted by at least one of said plasma arc and a shielding gas, further that said portion of said rear side workpiece material is brought into a molten state by a thermal conduction thereto so that said two spaced workpiece materials may be welded together at said portions, and that a swirling flow is imparted to a plasma gas of said plasma arc.

2. A plasma arc welding method as set forth in claim 1, characterized in that in the step in which said molten pool of said front side workpiece material is brought into contact with said rear side workpiece material, said pressure which is exerted by the at least one of said plasma gas and said shielding gas is adjusted by controlling at least one of a flow rate of said plasma gas, a flow rate of said shielding gas, a plasma welding current magnitude and a standoff in accordance with a particular quality of said front side workpiece material and a particular spacing which is formed between said two workpiece materials.

3. A plasma arc welding method as set forth in claim 1 or claim 2, characterized in that with respect to a welding current magnitude which is determined by a particular quality of said front side workpiece material and a particular welding bonded area, a flow rate of said plasma gas is controlled so as to lie within a particular range.

4. A plasma arc welding method as set forth in claim 3, characterized in that when said plasma welding current magnitude ranges between 40 and 100 amperes, said flow rate of said plasma gas lies between 2 and 5.6 liters/min.

5. A plasma arc welding method for welding together a front side workpiece material and a rear side workpiece material which are spaced apart from each other, comprising the steps of:

heating and melting a portion of said front side workpiece material using a plasma arc to form a molten pool in said portion;

holding said molten pool from dropping from said front side workpiece material by using a surface tension acting on the molten pool;

bringing said molten pool into contact with a portion of said rear side workpiece material by exerting a pressure using at least one of said plasma arc and a shielding gas;

bringing said portion of said rear side workpiece material into a molten state by thermal conduction between said front side workpiece material and said rear side workpiece material so that said workpiece materials become welded together at said portions; and imparting a swirling flow to a plasma gas of said plasma arc to stabilize said plasma arc while bringing said molten pool of said front side workpiece material into contact with said rear side workpiece material.

6. The plasma arc welding method as set forth in claim 5, further comprising the step of adjusting the pressure exerted on said molten pool by controlling at least one of a flow rate of said plasma gas, a flow rate of said shielding gas, a plasma welding current magnitude and a standoff in accordance with a particular quality of said front side workpiece material and a particular spacing formed between said workpiece materials.

7. The plasma arc welding method as set forth in claim 6, wherein said adjusting step comprises controlling a flow rate of said plasma gas so as to lie within a particular range.

8. The plasma arc welding method as set forth in claim 6, wherein said adjusting step comprises controlling a flow rate of said plasma gas so as to lie between 2 and 5.6 liters/min when said plasma welding current magnitude ranges between 40 and 100 amperes.

* * * * *